United States Patent
Hirokami et al.

(10) Patent No.: US 10,479,364 B2
(45) Date of Patent: Nov. 19, 2019

(54) ENGINE POWER SUPPRESSING DEVICE

(71) Applicant: KAWASAKI JUKOGYO KABUSHIKI KAISHA, Kobe-shi, Hyogo (JP)

(72) Inventors: Tatsuya Hirokami, Osaka (JP); Shohei Terai, Akashi (JP); Seiji Azuma, Hyogo (JP); Kengo Ueda, Akashi (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 118 days.

(21) Appl. No.: 15/702,952

(22) Filed: Sep. 13, 2017

(65) Prior Publication Data

US 2018/0072316 A1    Mar. 15, 2018

(30) Foreign Application Priority Data

Sep. 14, 2016    (JP) .................................. 2016-179706

(51) Int. Cl.
*B60W 30/188* (2012.01)
*B60W 30/02* (2012.01)

(52) U.S. Cl.
CPC .......... *B60W 30/188* (2013.01); *B60W 30/02* (2013.01); *B60W 2300/36* (2013.01); *B60W 2550/12* (2013.01); *B60W 2720/26* (2013.01)

(58) Field of Classification Search
CPC ......... B60W 2520/16; B60W 2520/26; B60W 2520/263; B60W 2550/12; B60W 2550/13; B60W 2710/0606; B60W 2710/0616; B60W 2710/0677; F02D 2009/0227; F02D 2200/703; F02D 2200/704

See application file for complete search history.

(56) References Cited

U.S. PATENT DOCUMENTS

| | | | | |
|---|---|---|---|---|
| 6,522,024 B1* | 2/2003 | Takaoka | ................. | B60K 6/445 290/40 C |
| 8,180,550 B2* | 5/2012 | Oshima | ................. | B60K 28/16 701/90 |
| 8,244,443 B2* | 8/2012 | Oshima | ................. | B60K 28/16 180/197 |
| 8,452,512 B2* | 5/2013 | Oshima | ................. | B60K 28/16 701/90 |

(Continued)

FOREIGN PATENT DOCUMENTS

JP        2011137416 A    7/2011

*Primary Examiner* — David R Morris
(74) *Attorney, Agent, or Firm* — Alleman Hall Creasman & Tuttle LLP (57) ABSTRACT

An engine power suppressing device includes a controller which controls an operation of a power changing element which changes engine power for driving a vehicle; and an environment sensor which detects an environment parameter indicating an environment in which the vehicle is used, wherein the controller determines whether or not a power suppressing condition in which a vehicle state is a state in which the engine power is to be suppressed, is met, wherein in a case where the controller determines that the power suppressing condition is met, the controller sets a suppressing value for the power changing element to suppress the engine power, and compensates the suppressing value based on the environment parameter detected by the environment sensor.

12 Claims, 4 Drawing Sheets

(56) References Cited

U.S. PATENT DOCUMENTS

| | | | | |
|---|---|---|---|---|
| 8,676,465 | B2* | 3/2014 | Oshima | B60T 8/1706 |
| | | | | 303/163 |
| 9,895,972 | B2* | 2/2018 | Hirokami | F02D 41/0087 |
| 2004/0182620 | A1* | 9/2004 | Domhausen | B60K 31/00 |
| | | | | 180/170 |
| 2007/0233332 | A1* | 10/2007 | Kawada | B60K 6/365 |
| | | | | 701/13 |
| 2009/0105043 | A1* | 4/2009 | Muta | B60W 20/13 |
| | | | | 477/97 |
| 2009/0326769 | A1* | 12/2009 | Oshima | B60K 28/16 |
| | | | | 701/51 |
| 2009/0326777 | A1* | 12/2009 | Oshima | B60T 8/1706 |
| | | | | 701/83 |
| 2010/0017077 | A1* | 1/2010 | Oshima | B60K 28/16 |
| | | | | 701/51 |
| 2012/0191309 | A1* | 7/2012 | Oshima | B60K 28/16 |
| | | | | 701/51 |
| 2016/0144854 | A1* | 5/2016 | Watanabe | B60W 30/02 |
| | | | | 477/185 |
| 2017/0101009 | A1* | 4/2017 | Hirokami | F02D 41/0087 |

* cited by examiner

ENGINE POWER SUPPRESSING DEVICE

CROSS-REFERENCE TO RELATED APPLICATION

This application claims priority to and the benefit of Japanese Patent Application No. 2016-179706 filed on Sep. 14, 2016, the entire disclosure of which is incorporated herein by reference.

BACKGROUND OF THE INVENTION

1. Field of the Invention

The present invention relates to an engine power (output) suppressing device.

2. Description of the Related Art

An exemplary controller for a vehicle disclosed in JP 2011 137416 A is configured to suppress engine power upon detection of a slip or a wheelie.

In suppressing the engine power, even in a situation in which running parameters (e.g., an engine speed, an air-intake amount, a fuel injection amount, and an ignition timing) of the engine are equal, non-uniformity of the amount of the engine power to be suppressed occurs.

SUMMARY OF THE INVENTION

In view of the above, an object of the present invention is to reduce non-uniformity of the amount of the engine power to be suppressed.

According to an aspect of the present invention, an engine power suppressing device comprises: a controller which controls an operation of a power changing element which changes engine power for driving a vehicle; and an environment sensor which detects an environment parameter indicating an environment in which the vehicle is used, wherein the controller determines whether or not a power suppressing condition in which a vehicle state of the vehicle is a state in which the engine power is to be suppressed, is met, wherein in a case where the controller determines that the power suppressing condition is met, the controller sets a suppressing value for the power changing element to suppress the engine power, and compensates the suppressing value based on the environment parameter detected by the environment sensor.

In accordance with this configuration, since the suppressing value of the power changing element is compensated, non-uniformity of the amount of the engine power to be suppressed, which occurs due to the use environment (environment in which the vehicle is used), can be compensated. Therefore, it becomes possible to reduce the non-uniformity of the amount of the engine power to be suppressed.

The environment parameter may be an environment value which affects the engine power. In accordance with this configuration, the engine power can be suppressed in view of the non-uniformity of the engine power and the non-uniformity of the amount of the engine power to be suppressed, due to the use environment.

The environment parameter may be an atmospheric pressure, and the environment sensor is an atmospheric pressure sensor which detects an atmospheric pressure in a region surrounding the vehicle, and the controller may compensate the suppressing value so that the engine power is more suppressed as the atmospheric pressure detected by the atmospheric pressure sensor is higher. As the atmospheric pressure is higher, the engine power is increased. In accordance with the above-described configuration, since the engine power is significantly suppressed when the atmospheric pressure is high, the engine power can be equalized (made uniform).

The power suppressing condition may include a condition in which the vehicle is in a slip state or a condition in which the vehicle is in a wheelie state. In accordance with this configuration, in a case where the slip or the wheelie occurs, the non-uniformity of the amount of the engine power to be suppressed, which occurs due to the use environment, and the non-uniformity of time required to terminate the slip or the wheelie, which occurs due to the use environment, can be reduced.

The engine power suppressing device may comprise a vehicle state sensor which detects the vehicle state, and in a case where the controller determines that the power suppressing condition is met, the controller may set the suppressing value based on the vehicle state detected by the vehicle state sensor, and compensate based on the environment parameter the suppressing value set based on the vehicle state. In accordance with this configuration, the non-uniformity of the amount of the engine power to be suppressed, which occurs due to the use environment, can be reduced.

The engine power suppressing device may comprises a driving operation sensor which detects a driving operation, and in a case where the controller determines that at least the power suppressing condition is not met, the controller may set a base value for the power changing element according to a base rule based on the driving operation detected by the driving operation sensor, and compensate the base value based on the environment parameter detected by the environment sensor, and in a case where the controller determines that the power suppressing condition is met, the controller may set the suppressing value according to a power suppressing rule different from the base rule, and compensate the suppressing value based on the environment parameter detected by the environment sensor. In accordance with this configuration, it becomes possible to reduce the non-uniformities due to the use environment, of the engine power decided depending on the driving operation in a state in which suppressing the engine power is not required, and the amount of the engine power to be suppressed, which is decided in a state in which suppressing the engine power is required. The compensation for preventing the non-uniformity of the engine power and the non-uniformity of the amount of the engine power to be suppressed can be prevented for the state in which suppressing the engine power is not required and the state in which suppressing the engine power is required.

A degree of a sensitivity of the suppressing value with respect to a change in the driving operation which is defined by the power suppressing rule may be less than the degree of the sensitivity of the base value with respect to the change in the driving operation which is defined by the base rule. In accordance with this configuration, the suppressing value is set without being affected by a change in the driving operation. Therefore, the engine power is easily forcibly suppressed irrelevantly of the driving operation. Since the suppressing value is compensated according to the use environment, the non-uniformity of the amount of the engine power to be suppressed due to the use environment can be reduced, irrelevantly of (without depending on) the driving operation.

In a case where the controller determines that the power suppressing condition is met, the controller may suppress the engine power in such a manner that the controller performs both of a first suppressing control for suppressing the engine power while performing combustion of an air-fuel mixture, and a second suppressing control for suppressing the engine power while performing the combustion of the air-fuel mixture at a reduced rate. In accordance with this configuration, by use of the second suppressing control, the engine power can be suppressed quickly. By use of the first suppressing control concurrently with the second suppressing control, the engine power can be suppressed while mitigating an impact transmitted to the rider. Further, the engine power is suppressed in view of the use environment. Therefore, even in a case where suppressing the engine power continues, it becomes possible to prevent a situation in which the engine power is suppressed excessively or insufficiently.

In a case where the controller determines that the power suppressing condition is met, the controller may set the suppressing value based on the vehicle state according to the power suppressing rule, and compensate the suppressing value so that the engine power is more suppressed as a power excess degree (engine power excess degree) based on the environment parameter is higher. In accordance with this configuration, since the engine power is more suppressed as the power excess degree is higher, the power excess state due to the use environment can be ended at earlier time.

In accordance with the present invention, the non-uniformity of the amount of the engine power to be suppressed, can be reduced.

The above and further objects, and advantages of the invention will more fully be apparent from the following detailed description with reference to the accompanying drawings.

DETAILED DESCRIPTION OF THE EMBODIMENTS

Hereinafter, the embodiment of the present invention will be described with reference to the drawings. The directions stated below are from the perspective of a rider in a vehicle. A vehicle length direction conforms to a forward and rearward direction, and a vehicle width direction conforms to a rightward and leftward direction.

Figure 1:
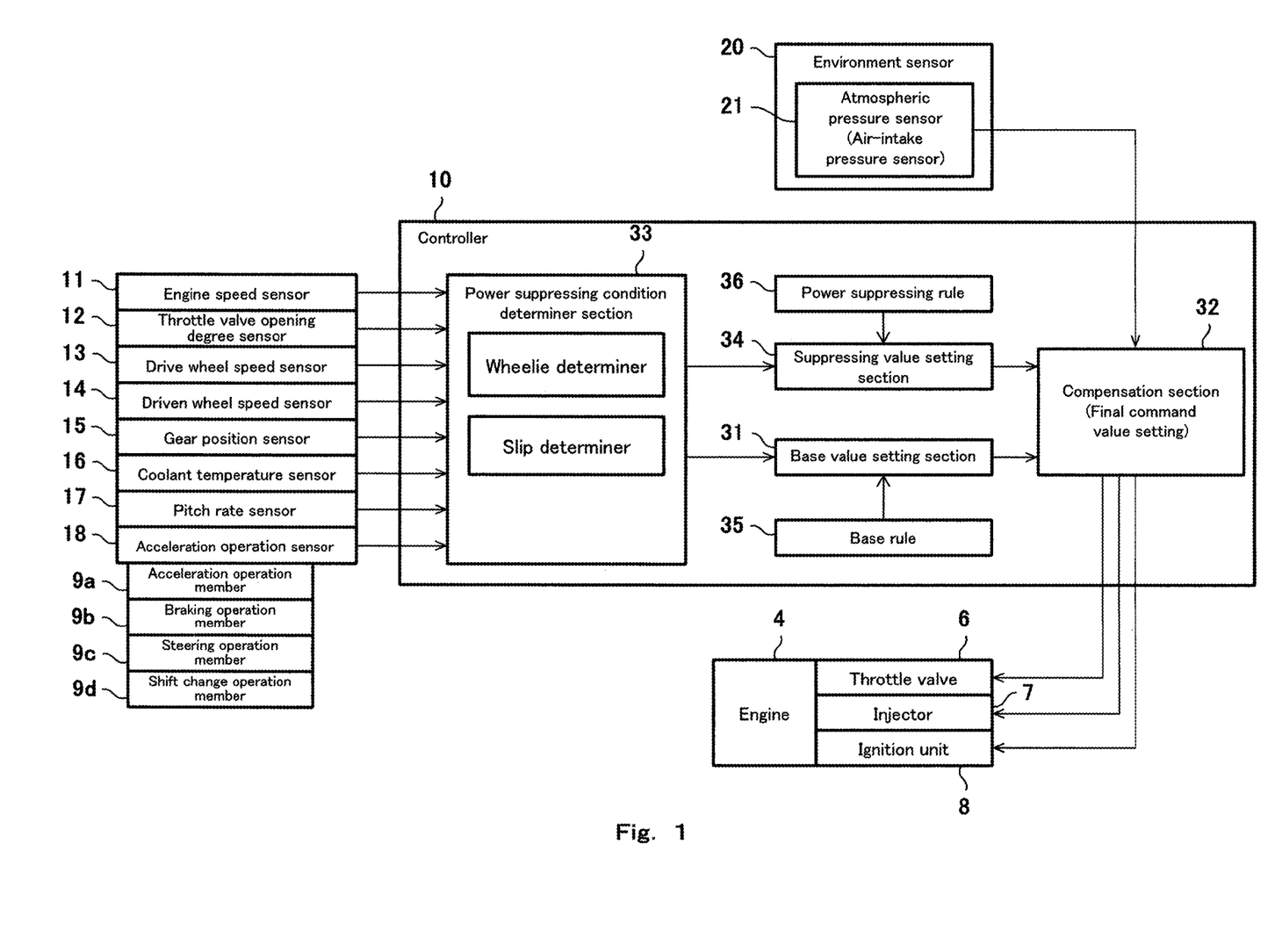
FIG. 1 is a block diagram showing an engine power suppressing device according to an embodiment.

FIG. 1 shows an engine power suppressing device. The engine power suppressing device is configured to suppress the engine power of an engine 4 mounted in a vehicle as a driving source. Although not shown in detail, a motorcycle is an example of a vehicle in which the engine power suppressing device is mounted. The motorcycle includes one front wheel and one rear wheel. The rear wheel is a drive wheel, and the front wheel is a driven wheel and a steering wheel. Driving power generated in the engine 4 is transmitted to the drive wheel (rear wheel) via a driving power transmission mechanism including a transmission and a clutch. The engine 4 which is an internal combustion engine is, for example, an ignition engine, a reciprocating engine, a gasoline engine, and a multi-cylinder engine.

As shown in FIG. 1, the engine 4 is provided with a throttle valve 6, an injector 7, and an ignition unit 8 as engine power changing elements (power changing elements) used to change the engine power. The throttle valve 6 is provided in an air-intake passage in such a manner that its opening degree is variable. The injector 7 injects fuel into the air-intake passage or a cylinder. The ignition unit 8 supplies an ignition trigger (spark or pilot fuel) to the inside of the cylinder. The ignition unit 8 causes an air-fuel mixture to be combusted inside the cylinder. This pushes a piston down. Thereby, an output shaft of the engine 4 rotates. The engine power is changed depending on the air-intake amount, the fuel amount, and the ignition timing. The air-intake amount is changed depending on the throttle valve opening degree (the opening degree of the throttle valve 6). The injector 7 is a normally closed electromagnetic valve. The fuel amount is changed depending on a open period of the injector 7.

The vehicle includes operation members which can be operated by the rider to perform driving operations. For example, the operation members include an acceleration operation member 9a operated by the rider to adjust the throttle valve opening degree, the engine power and hence a vehicle speed, a braking operation member 9b operated by the rider to brake a wheel, a steering operation member 9c operated by the rider to perform steering, and a shift change operation member 9d operated by the rider to perform a shift change operation. The acceleration operation member 9a may be a grip, a pedal, etc., which is suitable for the motorcycle. When the braking operation member 9b is operated, a hydraulic brake device for braking the wheel is actuated, and the wheel is braked. When the operation member 9c is operated, the direction of the steering wheel (front wheel) is changed. When the shift change operation member 9d is operated, a transmission gear position set in the transmission is changed.

The vehicle includes a controller 10 which controls the operations of the power changing elements (the throttle valve 6, the injector 7, and the ignition unit 8), and hence the engine power. The controller 10 is also referred to as an electronic control unit (ECU). The controller 10 receives as inputs information relating to "vehicle states" from vehicle state sensors. The controller 10 controls the operations of the power changing elements according to the detected vehicle states.

The controller 10 moves the throttle valve 6 to control the throttle valve opening degree, the air-intake amount, and hence the engine power. The controller 10 operates the injector 7 to control the open period (and the valve open timing and valve close timing) of the injector 7, the fuel amount, and hence the engine power. The controller 10 operates the throttle valve 6 and/or the injector 7 to control an air-fuel ratio and hence the engine power. The controller 10 operates the ignition unit 8 to control the ignition timings and hence the engine power. The controller 10 operates the injector 7 and/or the ignition unit 8 to control a combustion reduction rate (described later) and hence the engine power.

To realize an opening degree control performed by the controller 10, the throttle valve 6 includes a valve actuator (e.g., electric motor) which rotates a valving element. The controller 10 operates the valve actuator of the throttle valve 6 to control the rotation position of the valving element, and hence the throttle valve opening degree.

The vehicle state sensors are configured to detect the vehicle states. The "vehicle states" include the state of the engine 4, the state of the driving power transmission mechanism, the state of the wheel and the state of the vehicle body. As examples of the "vehicle states", there are an engine speed, the throttle valve opening degree, the air-fuel ratio, a gear position of the transmission, input/output rotational speed of a clutch, the vehicle speed, the rotational speed and circumferential speed of the wheel, a slip ratio of the drive wheel, tilt angles of the vehicle body in roll, pitching and yawing directions, and a wheelie amount. The "vehicle states" may also include changes over time of these.

The "vehicle states" include the rider's driving operations. The vehicle state sensors include driving operation sensors for detecting the driving operations. As examples of the "driving operations", there are a vehicle speed adjusting operation performed by use of the acceleration operation member 9a, a braking operation performed by use of the braking operation member 9b, and a steering operation performed by use of the steering operation member 9c. The driving operation to reduce the vehicle speed can be performed by use of the acceleration operation member 9a or the braking operation member 9b. "Detection of the driving operation" includes detection of whether or not the driving operation has been performed by the rider, and detection of an extent (degree) of the driving operation (operation amount or operation position of each operation member).

The vehicle includes environment sensors 20 which detect environment parameters. Even in a situation in which the parameters relating to the operations of the power changing elements, such as the air-intake amount, the fuel amount, and the ignition timing are the same, the engine power actually output from the engine 4 becomes non-uniform depending on an environment in which the vehicle is used (use environment of the vehicle). Each of the environment parameters indicates the environment in which the vehicle is used, and indicates an environment value which affects the engine power. Each of the environment parameters may be regarded as "power excess degree (engine power excess degree)", specifically, a degree with which the engine power is increased.

As examples of the environment parameters, there are an atmospheric pressure in a region surrounding the vehicle, an air temperature in the region surrounding the vehicle, octane rating of the fuel, and an alcohol content such as ethanol in the fuel. As the atmospheric pressure is higher, the air-intake pressure is higher, and the engine power is greater. As the air temperature is lower, filling efficiency of the air-fuel mixture is higher and the engine power is greater. As the atmospheric pressure is higher and the air temperature is lower, the power excess degree is higher.

In a situation in which the engine power actually output from the engine 4 is the same, non-uniformity of acceleration characteristics of the vehicle occurs depending on the environment in which the vehicle is used. Each of the environment parameters may be an environment value which affects the acceleration characteristics for the vehicle. The "power excess degree" may include "degree with which the engine power is increased" and "degree with which the acceleration characteristics of the vehicle are improved".

As examples of the environment parameters, there are a difference between direction of wind (weather wind direction other than air blowing from the front) and a traveling direction of the vehicle, a loaded weight on the vehicle, and a ground slope. As the difference between the wind direction and the traveling direction is closer to 180 degrees, a stronger wind force is applied to the rider from the front, and the acceleration characteristics are degraded. As the difference between the wind direction and the traveling direction is closer to 0 degree, a weaker wind force is applied to the rider from the front, and the acceleration characteristics are improved. The loaded weight includes the weight of baggage loaded on the vehicle, the weight of the rider, and the weight of a passenger. In the case of the motorcycle, a vehicle weight is small and the loading capacity is small. Therefore, it is important to take the weight of the rider and the weight of the passenger into account. As the loaded weight is smaller, a power-to-weight ratio [W/g] is higher and the acceleration characteristics are better. In a case where an upward slope is positive and a downward slope is negative, the acceleration characteristics are better as the slope of the ground surface is smaller. As should be understood, as the difference between the wind direction and the traveling direction is closer to 0 degree, the loaded weight is smaller, and the slope of the road surface is smaller, the power excess degree is increased.

The environment parameters can be classified depending on whether or not the parameter affects the engine power. The environment parameters may be classified into weather parameters associated with the weather, geography parameters associated with a road on which the vehicle travels, fuel characteristic parameters associated with the characteristics of the fuel, and use parameters associated with other environments in which the vehicle is used. The weather parameters may include a humidity (moisture content) in addition to the atmospheric pressure, the temperature and the wind direction. The geography parameters may include altitude (elevation) in addition to the slope of the ground surface. Note that the altitude correlates with the atmospheric pressure. As the altitude is higher, the atmospheric pressure is lower. The fuel characteristic parameters include the octane rating and the alcohol content. The use parameters may include an engine temperature as well as the loaded weight. Some of the parameters including the engine temperature may belong to the environment parameter and the vehicle state.

As examples of the vehicle state sensor, the vehicle includes an engine speed sensor 11 which detects the engine speed, a throttle valve opening degree sensor 12 which detects the throttle valve opening degree, a drive wheel speed sensor 13 which detects the rotational speed of the drive wheel (rear wheel), a driven wheel speed sensor 14 which detects the rotational speed of the driven wheel (front wheel), a gear position sensor 15 which detects the gear position of the transmission, a coolant temperature sensor 16 which detects a coolant temperature, a pitch rate sensor 17 which detects an angular velocity of the vehicle body in the pitching direction, and an acceleration operation sensor 18 which detects the operation position of the acceleration operation member 9a. The acceleration operation sensor 18 is an example of the driving operation sensor.

As an example of the environment sensor 20, the vehicle includes an atmospheric pressure sensor 21 for detecting the atmospheric pressure. The atmospheric pressure sensor 21 may be placed in an engine air-intake system of the vehicle to detect a pressure in the air-intake passage. In other words, an air-intake pressure sensor for detecting the air-intake pressure may be used as the atmospheric sensor 21. The air-intake pressure correlates with the atmospheric pressure. Therefore, a control may be performed in view of the atmospheric pressure with reference to the pressure in the air-intake passage.

The clutch input/output rotational speed can be estimated within the controller 10 based on the engine speed, the rotational speed of the drive wheel, and the gear position. The vehicle speed, the circumferential speed of the wheel, and the slip ratio can be detected (measured) by calculation within the controller 10 based on the rotational speed of the wheel. From this, the "vehicle state sensor," the "driving operation sensor," and the "environment sensor" may include software elements which function to derive the parameters (intermediate values) within the controller 10, as well as sensors in a limited sense (hardware devices which output signals indicating information).

The controller 10 includes a base value setting section 31, a compensation section 32, a power suppressing condition determiner section 33, and a suppressing value setting section 34. The base value setting section 31 sets a base value B for the power changing element. The compensation section 32 compensates the base value B based on the environment parameter to set a final command value S for the power changing element. The power suppressing condition determiner section 33 determines whether or not the power suppressing condition is met. In a case where the power suppressing condition is met, the suppressing value setting section 34 sets a suppressing value Y for the power changing element to suppress the engine power, and the compensation section 32 compensates the suppressing value Y based on the environment parameter to set the final command value S for the power changing element.

The "base value B for the power changing element" includes the base value of the throttle valve opening degree (or the air-intake amount), the base value of the open period (or the fuel amount) of the injector, the base value of the ignition timing, and the base value of the combustion reduction rate. The same applies to the "final command value S for the power changing element" and the "suppressing value Y for the power changing element".

As the air-intake amount (throttle valve opening degree) or the fuel amount is less, and the ignition timing is more retarded, the engine power is more suppressed. In a case where the air-intake amount, the fuel amount or the ignition timing is adjusted, combustion of the air-fuel mixture inside the cylinder is performed. In contrast, the engine power can also be suppressed by reduction of the combustion, in which the combustion of the air-fuel mixture is ceased (is not performed) in some of a plurality of expansion strokes occurring in succession according to the rotation of the output shaft of the engine 4. To cease the combustion, supply of the fuel or the ignition trigger may be ceased. Hereinafter, ceasing the fuel supply without opening the injector 7 will be referred to as "fuel reduction," and ceasing the ignition trigger supply without operating the ignition unit 8 will be referred to as "ignition reduction." The "combustion reduction rate" is defined as a ratio of the number of times the combustion reduction occurs with respect to the plurality of expansion strokes occurring in succession. As the combustion reduction rate is higher, the engine power is more suppressed.

Hereinafter, the control for suppressing the engine power while maintaining the combustion inside the cylinder will be referred to as "first suppressing control," and the control for suppressing the engine power while performing the combustion of the air-fuel mixture inside the cylinder at a reduced rate (while ceasing the combustion of the air-fuel mixture in some of the plurality of expansion strokes) will be referred to as "second suppressing control." For example, the first suppressing control includes an intake-air amount control (throttle valve opening degree reduction control), a fuel amount reduction control, and an ignition retard control. For example, the second suppressing control includes the combustion reduction control. The combustion reduction control includes the ignition reduction control and the fuel reduction control.

In the first suppressing control, the air-fuel mixture is combusted in all of the cylinders. For this reason, it is difficult to rapidly reduce the engine power. In the intake-air amount control, even when a command for suppressing the engine power is provided to the throttle valve 6, it takes some time for the rotational position of the valving element to reach a statically determinate value. In this respect, it is difficult to rapidly reduce the engine power by the first suppressing control. In other words, since the engine power is gradually reduced, an impact is less likely to be transmitted to the rider. Since each of the throttle valve opening degree and the ignition timing has continuity, the first suppressing control is suited for fine adjustment of the engine power although the command value is a digital amount. Therefore, the first suppressing control is capable of suppressing the engine power without significantly degrading the rider's driving feeling. The first suppressing control has the characteristics as described above.

In the second suppressing control, since the combustion of the air-fuel mixture in part of the cylinders does not occur, the engine power can be rapidly reduced. If the extent of the second suppressing control is increased by, for example, increasing the combustion reduction rate, the rider easily becomes aware that the combustion of the air-fuel mixture is not currently performed by a sense of a force or a sense of hearing, which makes the rider's driving feeling worse. The numeric value of the combustion reduction rate has relatively high discreteness. Therefore, the amount of the engine power to be suppressed is unavoidably changed in a stepwise manner when the extent of the second suppressing control is changed. Therefore, a change in the extent of the second suppressing control may be transmitted to the rider as an impact. The second suppressing control has the characteristics as described above.

The "power suppressing condition" is such that the vehicle state is a state in which the engine power is to be suppressed. As examples of the vehicle state in which the power suppressing condition is met, there are a state in which the wheelie is occurring in the vehicle, and a state in which the slip is occurring in the vehicle. The wheelie and the slip tend to occur in a case where the driving power transmitted to the drive wheel, namely, the rear wheel is excessively large, and degrades steering stability. Even in a case where the amount of the operation of the acceleration operation member 9a performed by the rider is not reduced, the wheelie or the slip can be terminated, and the steering stability can be maintained or restored by positively suppressing the engine power.

The power suppressing condition associated with the wheelie (hereinafter this will be referred to as "wheelie condition") may be a condition in which a wheelie amount indicating the amount of a lift-off of the front wheel from the ground surface is equal to or greater than a predetermined threshold. The wheelie amount can be estimated from the pitch angular velocity detected by the pitch rate sensor 17. When the wheelie condition is met, the controller 10 initiates a wheelie suppressing control for suppressing the engine power.

The power suppressing condition associated with the slip (hereinafter this will be referred to as a "slip condition") may be a condition in which the slip ratio is equal to or higher than a predetermined threshold. The slip ratio is a numeric value indicating a relativity of the rotational speed between the drive wheel and the driven wheel. As the value of the slip ratio is greater, a degree of a slip of the drive wheel on the ground surface (the circumferential speed of the drive wheel with respect to the ground speed of the vehicle body) is higher. For example, the slip ratio can be derived by subtracting from 1 a value obtained by dividing the rotational speed Vf of the driven wheel by the rotational speed Vr of the drive wheel (1−Vf/Vr). When the slip condition is met, the controller 10 initiates the slip suppressing control for suppressing the engine power to terminate the slip of the drive wheel.

In a case where plural kinds of conditions (e.g., the wheelie condition and the slip condition) are considered as described above, the power suppressing condition determiner section 33 determines that the power suppressing condition is not met, when these conditions are not met.

When the power suppressing condition is not met, the base value setting section 31 sets the base value according to the base rule 35 based on the vehicle state. The base rule 35 is a rule defining a correspondence between the vehicle state and the base value, and is stored in the controller 10. The base rule 35 may be permanently and unchangeably stored in the controller 10 at a shipment stage of the controller 10, or updated and stored in the controller 10 during practice through a learning control performed by the controller 10. The base rule 35 may have any form so long as the output (base value) can be obtained according to the input (vehicle state). For example, the base rule 35 may be an arithmetic equation within a program, a control map or a table stored in a storage area within the controller 10. In a case where the table is used, the base rule may include a routine for interpolation processing.

Figure 2:
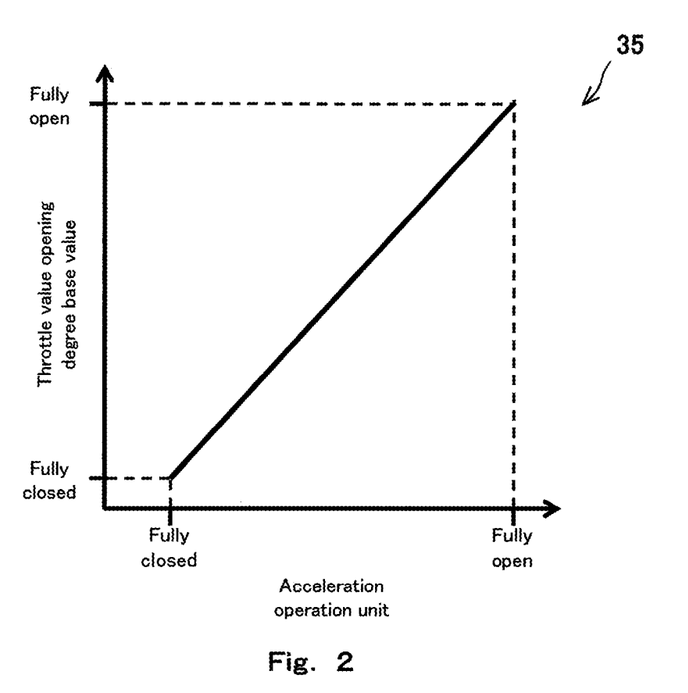
FIG. 2 is a view showing an example of a base rule.

FIG. 2 shows the base rule 35 for the throttle valve opening degree. In the example of FIG. 2, the base value of the throttle valve opening degree is substantially proportional to the driving state detected by the driving state sensor, for example, the operation position of the acceleration operation member 9a which is detected by the acceleration operation sensor 18. The base value of the fuel amount and the base value of the ignition timing are decided based on the engine speed, the throttle valve opening degree, or the like. However, the base value of the combustion reduction rate is zero irrespective of the driving state (the combustion reduction is not performed).

The compensation section 32 sets the final command value in such a manner that the compensation section 32 compensates the base value so that the engine power is more suppressed as the "power excess degree" indicated by the environment parameter is higher. For example, as the atmospheric pressure is higher, the power excess degree is higher. In view of this, the compensation section 32 compensates the base value so that the engine power is more suppressed, as the atmospheric pressure detected by the atmospheric pressure sensor 21 is higher. By this compensation, non-uniformity of the engine power due to the atmospheric pressure can be obviated.

In a case where the power suppressing condition is not met, the compensation section 32 compensates a part of the base values of the throttle valve opening degree, the fuel amount, the ignition timing, and the combustion reduction rate. For example, in a case where the power suppressing condition is not met, the base value of the combustion reduction rate is fixed to zero irrespective of the environment parameter, and the combustion of the air-fuel mixture is performed in all of the expansion strokes. In some cases, the compensation section 32 operates to suppress the engine power by the "first suppressing control," even when the power suppressing condition is not met. In that case, for example, the fuel amount reduction control is performed as the first suppressing control. In a case where the power suppressing condition is not met, the base value of the fuel amount is compensated. In the fuel amount reduction control, the compensation section 32 sets the final command value of the fuel amount to a smaller value as the power excess degree is higher. For example, the compensation section 32 derives the final command value of the fuel amount by multiplying the base value by an environment compensation coefficient defined according to the environment parameter.

In a case where the power suppressing condition determiner section 33 determines that the power suppressing condition is met, the suppressing value setting section 34 sets the suppressing value Y according to the power suppressing rule 36. The power suppressing rule 36 is a rule defining a correspondence between the vehicle state and the suppressing value Y and is stored in the controller 10.

The compensation section 32 derives the final command value S according to, for example, the following formula (1a) or (1b):

$$S=B-Y\times K \tag{1a}$$

$$S=B+Y\times K \tag{1b}$$

B indicates the base value defined according to the base rule 35, Y indicates the suppressing value defined according to the power suppressing rule 36, and K indicates the environment compensation coefficient defined according to the environment parameter. The formula (1a) is such that the suppressing value Y is subtracted from the base value B and is suitable for the throttle valve opening degree and the fuel amount. The formula (1b) is such that the suppressing value Y is added to the base value B and is suitable for the ignition timing. In that case, the ignition retard amount as the suppressing value Y takes a negative value.

In the case of the formula (1a) and the formula (1b), a difference between the base value B and the command value for which the compensation according to the environment parameter is not considered (namely, the throttle valve opening degree reduction amount, the fuel amount reduction amount, the ignition timing retard amount, and the combustion reduction rate for which the compensation according to the environment is not considered) is Y. The amount of the engine power to be suppressed based on this difference Y becomes non-uniform depending on the use environment (environment in which the vehicle is used). Therefore, the compensation section 32 performs the compensation using the environment compensation coefficient K. A difference between the base value B and the final command value S (namely, the throttle valve opening degree reduction amount, the fuel amount reduction amount, the ignition timing retard amount, and the combustion reduction rate for which the compensation according to the environment is considered) is Y×K. The non-uniformity of the amount of the engine power to be suppressed is compensated by use of the coefficient K. The compensation amount used for compensating the non-uniformity of the amount of the engine power to be suppressed is Y−Y×K=Y(1−K).

The compensation section 32 may derive the final command value S by the following formula (2a) or (2b):

$$S=B\times Y\times K \tag{2a}$$

$$S=B\times(1\times Y\times K) \tag{2b}$$

In this case, the suppressing value Y is a coefficient by which the base value B is multiplied. In the case of the formula (2a), the difference between the base value B and the command value for which the compensation based on the environment parameter is not considered is B (1−Y). The amount of the engine power to be suppressed based on this difference B (1−Y) becomes non-uniform depending on the use environment. Therefore, the compensation section 32 performs the compensation by use of the environment compensation coefficient K. A difference between the base value B and the final command value S is B (1−Y×K). The non-uniformity of the amount of the engine power to be suppressed is compensated by use of the coefficient K. The compensation amount used for compensating the non-uniformity of the amount of the engine power to be suppressed is B (1−Y)−B (1−Y×K)=BY (K−1).

In contrast, in the case of the formula (2b), the difference between the base value B and the command value for which the compensation based on the environment parameter is not considered is B×Y. The amount of the engine power to be suppressed based on this difference B×Y becomes non-uniform depending on the use environment. Therefore, the compensation section 32 performs the compensation by use of the environment compensation coefficient K. A difference between the base value B and the final command value S is B×Y×K. The non-uniformity of the amount of the engine power to be suppressed is compensated by use of the coefficient K. The compensation amount used for compensating the non-uniformity of the amount of the engine power to be suppressed is B×Y−B×Y×K=BY (1−K)

The compensation section 32 may derive the final command value S according to the following formula (3):

$$S = Y \times K \quad (3)$$

In this way, the final command value S may be derived based on the suppressing value Y defined according to the power suppressing rule 36 and the environment compensation coefficient K, without using the base value B defined according to the base rule 35. In the case of the formula (3), the difference between the base value B and the command value for which the compensation based on the environment parameter is not considered is B−Y. The amount of the engine power to be suppressed based on this difference B−Y becomes non-uniform depending on the use environment. Therefore, the compensation section 32 performs the compensation by use of the environment compensation coefficient K. A difference between the base value B and the final command value S is B−Y×K. The non-uniformity of the engine power to be suppressed is compensated by use of the coefficient K. The compensation amount for compensating the non-uniformity of the engine power to be suppressed is B−Y−(B−Y×K)=Y (K−1).

Irrespective of how the final command value S is derived by the compensation section 32, the suppressing value Y affects the difference between the base value B and the final command value S (the throttle valve opening degree reduction amount with respect to the base value, the fuel amount reduction amount with respect to the base value, the ignition timing retard amount with respect to the base value, the combustion reduction rate with respect to the base value). As the suppressing value Y changes, the difference changes. The compensation section 32 compresses the suppressing value Y based on the environment parameter. For example, the compensation section 32 derives the environment compensation coefficient K based on the environment parameter, and performs the compensation by multiplication.

The suppressing value Y to be set by the suppressing value setting section 34 may be chosen from the three kinds of suppressing values as described above. The suppressing value Y is suitably chosen, depending on which of the throttle valve opening degree, the fuel amount, the ignition timing, and the fuel reduction rate, the suppressing value corresponds to, or depending on which of the plurality of power suppressing conditions is met when the power suppressing control is to be initiated.

The final command values in the case where the power suppressing condition is not met is the base value B. Or, the final command values may be a value derived by compensating the base value B by use of the environment parameter. This makes it possible to suppress degradation of drivability or exhaust gas characteristics in the case where the power suppressing condition is not met (or while the vehicle is traveling normally). In a case where the compensation is performed during the normal traveling, the compensation based on the environment parameter in the case where the power suppressing condition is met is preferably made different from the compensation based on the environment parameter in the case where the power suppressing condition is not met. For example, the rule used for deriving the environment compensation coefficient K and the formula used for deriving the final power value by use of the environment compensation coefficient K may be different between the case where the power suppressing condition is met and the case where the power suppressing condition is not met. This makes it possible to suppress degradation of the drivability or the exhaust gas characteristics and equalize the amount of the engine power to be suppressed in a case where suppressing the engine power is required.

Hereinafter, the wheelie suppressing control will be exemplarily described as the control performed in the case where the power suppressing condition is met will be described in detail. In description below, S, Y, and K indicating the final command value, the suppressing value, and the environment compensation coefficient, respectively, are added with an index W corresponding to the wheelie suppressing control, an index TH corresponding to the throttle valve opening degree, an index IGT corresponding to the ignition timing, and an index IGT corresponding to the ignition reduction control.

The controller 10 determines whether or not the wheelie condition is met, at two stages. At the first stage, the controller 10 determines whether or not the vehicle is in a "wheelie preceding state," based on the vehicle speed, the speed of the wheel, or the engine power (e.g., the throttle valve opening degree which highly correlates with this). The wheelie preceding state is defined as a state in which the front wheel 2 has just begun to lift-off the ground surface. When the controller 10 determines that the vehicle is in the wheelie preceding state, then the controller 10 determines whether or not the wheelie amount is equal to or greater than a predetermined threshold, at the second stage. The calculation of the wheelie amount begins from a time point when the controller 10 determines that the vehicle is in the wheelie preceding state. The wheelie amount is calculated by integrating the pitch angular velocities output in succession from the pitch rate sensor 17, and simply indicates the amount of the lift-off of the front wheel 2 from the ground surface after the controller 10 has determined that the vehicle is in the wheelie preceding state. When the controller 10 determines that the wheelie amount is equal to or greater than the predetermined threshold, at the second stage, the controller 10 determines that the wheelie condition is met. When the controller 10 determines that the wheelie condition is met, the controller 10 initiates the wheelie suppressing control.

In the wheelie suppressing control, the controller 10 performs both of the first suppressing control and the second suppressing control. As the first suppressing control, the controller 10 performs the throttle valve opening degree reduction control and the ignition retard control. As the second suppressing control, the controller 10 performs the combustion reduction control, especially the ignition reduction control. The power suppressing rule 36 includes a first power suppressing rule 36a (see FIG. 3A) used for deriving a suppressing value YWTH of the throttle valve opening degree in the wheelie suppressing control, a second power suppressing rule used for deriving a suppressing value YWIGT of the ignition timing in the wheelie suppressing control, and a third power suppressing rule 36c (see FIG. 3B) used for deriving a suppressing value YWIGM of the ignition reduction rate in the wheelie suppressing control.

The compensation section 32 sets a final command value SWTH of the throttle valve opening degree in the wheelie suppressing control, according to the following formula (4) which is on the basis of the above formula (2b). The compensation section 32 sets a final command value SWIGT of the ignition timing in the wheelie suppressing control, according to the following formula (5) which is on the basis of the above formula (1b). The compensation section 32 sets a final command value SWIGM of the ignition reduction rate in the wheelie suppressing control, according to the following formula (6) which is on the basis of the above formula (3).

$$SWTH = BTH(1 - YWTH \times KWTH) \quad (4)$$

$$SWIGT = BIGT + YWIGT \times KWIGT \quad (5)$$

$$SWIGM = YWIGM \times KWIGM \quad (6)$$

BTH indicates the base value of the throttle valve opening degree which is set according to the base rule 35, and BIGT indicates the base value of the ignition timing. KWTH indicates the environment compensation coefficient for the throttle valve opening degree in the wheelie suppressing control, KWIGT indicates the environment compensation coefficient for the ignition timing, and KWIGM indicates the environment compensation coefficient for the ignition reduction rate.

Figure 3A:
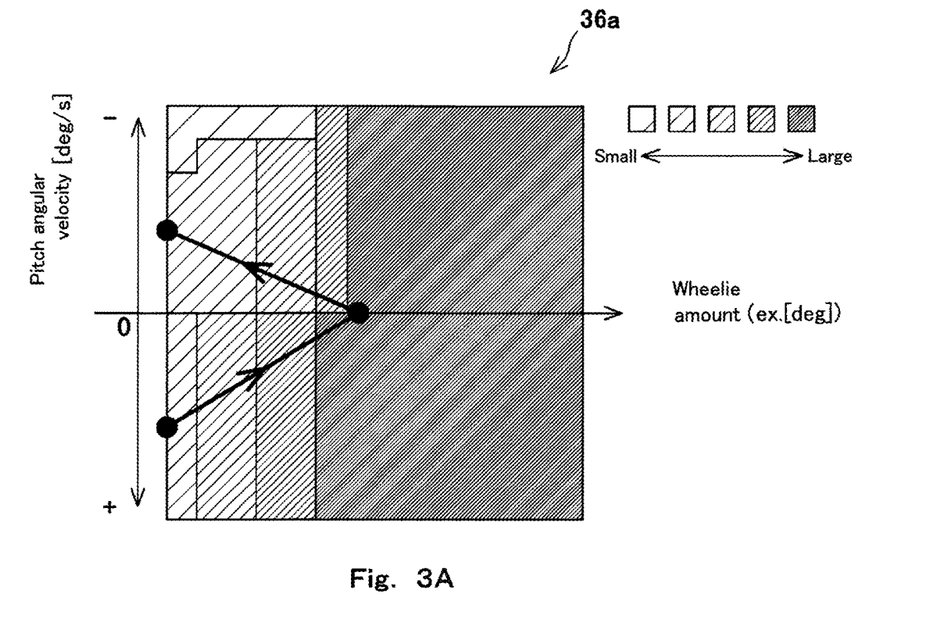
FIGS. 3A and 3B are views showing an example of a power suppressing rule.
Figure 3B:
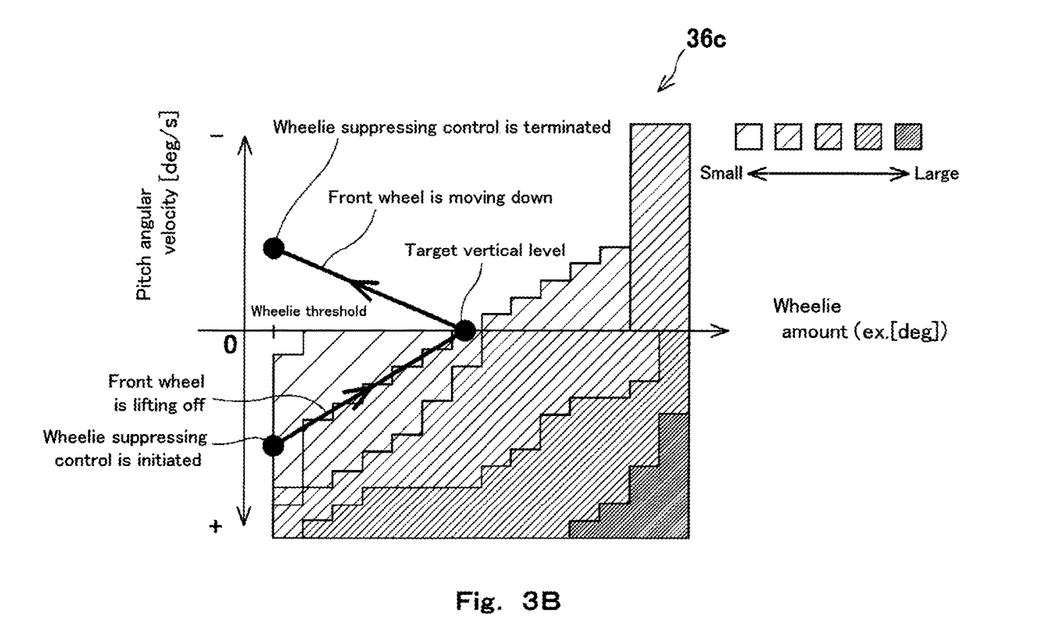

FIG. 3A shows an example of the first power suppressing rule 36a. FIG. 3B shows an example of the third power suppressing rule 36c. In the power suppressing rule 36, the driving states (especially the states of the vehicle body) which are the wheelie amount and the pitch angular velocity correspond to the suppressing value Y. The suppressing value Y is derived independently of the driving operation. Therefore, the power suppressing rule 36 is different from the base rule 35. The base value B derived according to the base rule 35 depends on the driving operation, whereas the suppressing value Y derived according to the power suppressing rule 36 does not depend on the driving operation. The degree of dependency of the suppressing value Y on the driving operation is less than the degree of dependency of the base value B on the driving operation. In other words, the degree of sensitivity of the suppressing value Y with respect to a change in the driving operation is less than the degree of sensitivity of the base value B with respect to a change in the driving operation. Regarding each of the degree of dependency and degree of sensitivity, its magnitude is compared. Each of the degree of dependency and the degree of sensitivity includes zero.

As shown in FIGS. 3A and 3B, from the power suppressing rule 36, the suppressing value Y is derived, which causes the engine power to be more suppressed as the pitch angular velocity is positive and higher and the wheelie amount is greater. In the case of the throttle valve opening degree, the suppressing value YWTH increases and approaches 1. In the case of the ignition reduction rate, the suppressing value YWIGM increases and approaches 1.

Around the time when the wheelie state begins, a degree of contribution to suppressing the engine power achieved by the wheelie suppressing control is higher in the second suppressing control than in the first suppressing control. Around the time when the wheelie state ends, the degree of the contribution is higher in the first suppressing control than in the second suppressing control. In other words, for a time period from the beginning of the wheelie state to the end of the wheelie state, the major role in suppressing the engine power shifts from the second suppressing control to the first suppressing control.

Regarding this respect, FIGS. 3A and 3B schematically show an example of a change in the pitch angular velocity and a change in the wheelie amount during the execution of the wheelie suppressing control, from a time point when the controller 10 determines that the wheelie condition is met until a time point when the controller 10 determines that the wheelie condition is not met in such a manner that these changes are superposed on the first power suppressing rule 36a and the third power suppressing rule 36c. At the time point when the controller 10 determines that the wheelie condition is met, the wheelie amount is equal to a threshold. At this time, since the front wheel 2 starts to lift off the ground surface, the pitch angular velocity takes a certain positive value. With an increase in the wheelie amount from a time point when the pitch angular velocity takes the certain positive value, the pitch angular velocity is reduced by suppressing the engine power. When the front wheel 2 reaches a certain vertical level by suppressing the engine power, the pitch angular velocity becomes zero. While the front wheel 2 is moving down toward the ground surface thereafter, the pitch angular velocity is gradually reduced from zero (absolute value is gradually increased), and the wheelie amount is reduced. When the wheelie amount reaches the threshold and the power suppressing condition determiner section 33 determines that the wheelie condition is not met, the controller 10 terminates the wheelie suppressing control.

The ignition reduction rate exceeds zero from a time point when the wheelie condition is met until the front wheel 2 reaches a certain vertical level by suppressing the engine power, and is set to zero while the front wheel 2 is moving down. The ignition reduction control which is an example of the second suppressing control is performed for a time period from when the wheelie condition is met until the front wheel reaches a certain vertical level by suppressing the engine power, and is terminated while the front wheel 2 is moving down toward the ground surface.

In contrast, the throttle valve opening degree exceeds zero throughout a time period from the time point when the wheelie state is detected until the wheelie state is terminated. Specifically, a basic control content is such that the intake-air amount control (throttle valve opening degree reduction control) which is an example of the first suppressing control is performed throughout a time period for which the controller 10 determines that the vehicle is in the wheelie state.

As described above, the two suppressing controls are initiated at the time point when the controller 10 determines that the wheelie condition is met. However, the second suppressing control is terminated when some time passes thereafter. In the present example, around the time when the pitch angular velocity is reduced to zero and the front wheel 2 reaches the certain vertical level by suppressing the engine power, the second suppressing control is terminated. As described above, the first suppressing control is incapable of rapidly suppressing the engine power. For this reason, around the time of the beginning of the wheelie state, the degree of contribution to suppressing the engine power achieved by the wheelie suppressing control is relatively higher in the second suppressing control than in the first suppressing control. Since the responsivity of the second suppressing is high, the engine power can be suitably suppressed at an initial stage of the wheelie. The second suppressing control is performed for a time period that passes until the first suppressing control reaches a stabilized state. Around the time when the first suppressing control is stabilized and becomes capable of effectively suppressing the engine power, the second suppressing control is terminated. Around the time of the end of the wheelie state, the degree of contribution to suppressing the engine power achieved by the wheelie suppressing control is relatively higher in the first suppressing control than in the second suppressing control.

Just after the wheelie condition has been met, the second suppressing control can suppress the engine power with a quicker responsivity. This makes it possible to avoid occurrence of an excessive wheelie and terminate the wheelie state at earlier time. After the first suppressing control has begun to work effectively to suppress the engine power, the engine power can be gently suppressed, and good driving feeling can be kept. In the parallel use of the first suppressing control and the second suppressing control, the timings at which these suppressing controls are initiated and terminated, and time periods for which these suppressing controls are performed, are set in view of the characteristics of these suppressing controls. Therefore, it becomes possible to terminate the wheelie state at earlier time and keep good driving feeling. In addition, at the time point when the first suppressing control has begun to work effectively to suppress the engine power, it becomes possible to avoid a situation in which the two suppressing controls are performed at the same time and the engine power is significantly suppressed. Therefore, an impact transmitted to the rider can be mitigated.

Figure 4:
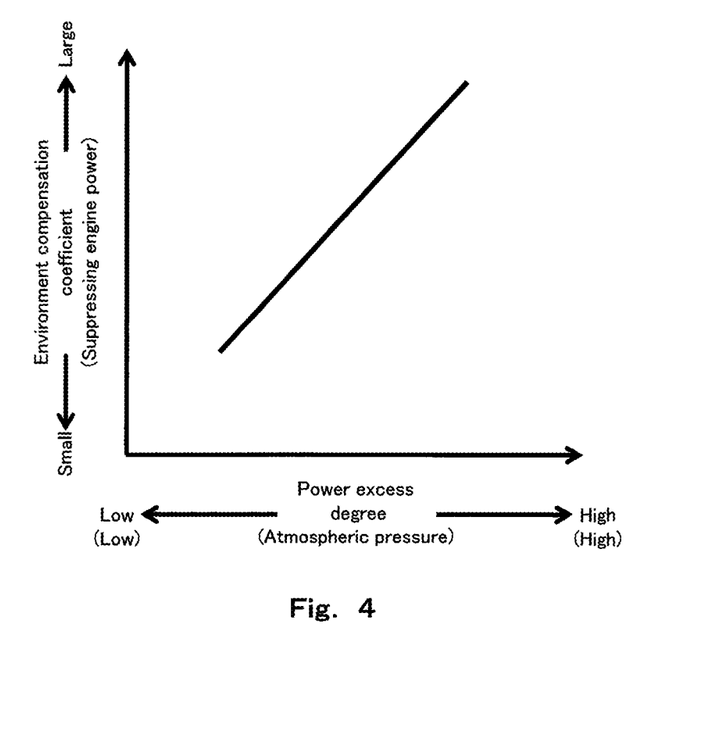
FIG. 4 is a view showing a correspondence between an environment parameter and an environment compensation coefficient.

In a case where the power excess degree of the use environment is high, for example, a case where the altitude is low and the atmospheric pressure is high, the amount of the engine power to be suppressed is relatively small. In this case, the front wheel 2 lifts off the ground surface more than expected, and it is difficult to terminate the wheelie. To solve this, the compensation section 32 performs the compensation by use of the environment compensation coefficient KWTH, KWIGM. As shown in FIGS. 4A and 4B, the environment compensation coefficient K is derived so that the engine power is more suppressed as the power excess degree based on the environment parameter (e.g., atmospheric pressure) is higher. In this way, the amount of the engine power to be suppressed can be made uniform, a vertical level to which the front wheel 2 lifts-off can fall within an assumed range, and the non-uniformity of time required to terminate the wheelie can be reduced, irrelevantly of (without depending on) the use environment.

In the above-described example, the controller 10 does not perform the fuel amount reduction control during the wheelie suppressing control. The fuel amount is compensated based on the environment parameter irrespective of whether or not the wheelie condition is met. As the power excess degree is higher, the fuel amount is reduced, and thus the air-fuel ratio is adjusted.

As described above, the engine power suppressing device of the present embodiment includes the controller 10 which controls the operations of the power changing elements (the throttle valve 6, the injector 7, and the ignition unit 8) which change the engine power, and the environment sensors 20 which detect the environment parameters indicating the environments in which the vehicle is used. The controller 10 determines whether or not the power suppressing condition is met, in which the vehicle state is the state in which the engine power should be suppressed. In a case where the controller 10 determines that the power suppressing condition is met, the controller 10 sets the suppressing value Y for each of the power changing elements 6 to 8, to suppress the engine power. Then, the controller 10 compensates the suppressing value Y based on the environment parameter detected by the environment sensor 20. By compensating the suppressing value Y for the power changing element in this way, it becomes possible to compensate the non-uniformity of the amount of the engine power to be suppressed due to the use environment. In this way, the non-uniformity of the amount of the engine power to be suppressed can be reduced.

The environment parameter is the environment value which affects the engine power. Therefore, the engine power can be suppressed in view of the non-uniformity of the engine power and the non-uniformity of the amount of the engine power to be suppressed, which occur due to the use environment. The environment parameter is, for example, the atmospheric pressure. The environment sensor 20 includes the atmospheric pressure sensor 21 which detects the atmospheric pressure in a region surrounding the vehicle. The controller 10 compensates the suppressing value Y so that engine power is more suppressed as the atmospheric pressure detected by the atmospheric pressure sensor 21 is higher. As the atmospheric pressure is higher, the engine power is increased. Since the engine power is significantly suppressed in a case where the atmospheric pressure is high, the engine power can be equalized (made uniform).

The power suppressing condition includes a condition (wheelie condition) in which the vehicle is in the wheelie state. In the case of occurrence of the wheelie, the non-uniformity of the amount of the engine power to be suppressed, which occurs due to the use environment, and the non-uniformity of time required to terminate the wheelie, which occurs due to the use environment, can be reduced. The power suppressing condition may also include a condition (slip condition) in which the wheelie is in a slip state. Also, in this case, the non-uniformity of the amount of the engine power to be suppressed, which occurs due to the use environment, and the non-uniformity of time required to terminate the slip, which occurs due to the use environment, can be reduced, although not described in detail. Specifically, for example, it becomes possible to solve a problem that the slip or the wheelie cannot be easily terminated while the vehicle is traveling in a low area above sea level, although the slip or the wheelie can be properly terminated while the same vehicle is traveling in a high area above the sea level.

The engine power suppressing device includes the vehicle state sensor which detects the vehicle state. In a case where the controller 10 determines that the power suppressing condition is met, the controller 10 may set the suppressing value Y based on the detected vehicle state, and compensate the suppressing value Y set based on the vehicle state, by use of the environment parameter. This makes it possible to reduce the non-uniformity of the amount of the engine power to be suppressed due to the use environment.

The engine power suppressing device includes the driving operation sensor which detects the driving operation. In a case where the controller 10 determines that at least the power suppressing condition is not met, the controller 10 sets the base value B for each of the power changing elements 6 to 8 according to the base rule 35 based on the driving operation detected by the driving operation sensor, and compensates the base value B based on the environment parameter detected by the environment sensor 20. On the other hand, in a case where the controller 10 determines that the power suppressing condition is met, the controller 10 sets the suppressing value Y according to the power suppressing rule 36 different from the base rule 35, and compensates the suppressing value Y based on the environment parameter detected by the environment sensor 20. In this way, it becomes possible to reduce the non-uniformities due to the use environment, of the engine power decided according to the driving operation in a state in which suppressing the engine power is not required and of the amount of the engine power to be suppressed, which is decided in a state in which suppressing the engine power is required. The compensation for preventing the non-uniformity of the engine power and the non-uniformity of the amount of the engine power to be suppressed can be performed for the state in which suppressing the engine power is not required and the state in which suppressing the engine power is required.

The degree of sensitivity of the suppressing value Y with respect to a change in the driving operation which is defined by the power suppressing rule 36 is less than the degree of sensitivity of the base value B with respect to a change in the driving operation which is defined by the base rule 35. In the present embodiment, the degree of sensitivity of the suppressing value Y is zero. The suppressing value Y is derived irrelevantly of the driving operation. The suppressing value Y is set without being affected by a change in the driving operation. Therefore, the engine power is easily forcibly suppressed irrelevantly of the driving operation. Since the suppressing value Y is compensated according to the use environment, the non-uniformity of the amount of the engine power to be suppressed due to the use environment can be reduced, irrelevantly of the driving operation.

In a case where the controller 10 determines that the power suppressing condition is met, the controller 10 performs the first suppressing control for suppressing the engine power while performing combustion of the air-fuel mixture, and the second suppressing control for suppressing the engine power while performing the combustion of the air-fuel mixture at a reduced rate. By use of the second suppressing control, the engine power can be suppressed quickly. By use of the first suppressing control concurrently with the second suppressing control, the engine power can be suppressed while mitigating an impact transmitted to the rider. In both of the first suppressing control and the second suppressing control, the suppressing value Y is compensated in view of the use environment. Therefore, even in a case where suppressing the engine power continues, it becomes possible to prevent a situation in which the engine power is suppressed excessively or insufficiently.

In a case where the controller 10 determines that the power suppressing condition is met, the controller 10 sets the suppressing value Y based on the vehicle state according to the power suppressing rule 36, and compensates the suppressing value Y so that the engine power is more suppressed as the power excess degree based on the environment parameter is higher. Since the engine power is more suppressed as the power excess degree is higher, the power excess state due to the use environment can be ended at earlier time.

The above-described embodiment is merely exemplary, and may be changed, added or deleted within the scope of the invention.

For example, the controller 10 may control the engine power based on the environment parameter other than the atmospheric pressure. Other examples of the environment parameter are described above. The fuel characteristics (octane rating and alcohol content) can be detected based on the information from a sensor which detects an oxygen concentration within an exhaust pipe. Further, the engine power may be suppressed based on two or more environment parameters.

The trend of the compensation by use of the environment parameter is such that the engine power is more suppressed as the power excess degree based on the environment parameter is higher. The extent of the compensation and the kind of the environment parameter to be referred to for the compensation can be suitably selected depending on the configuration of the engine 4 and the configuration of the air-intake system. For example, in the case of a naturally aspirated engine, the extent of the compensation based on the atmospheric pressure or the altitude may be increased. In the case of an engine with a supercharger, the extent of the compensation based on an ambient temperature or an engine temperature may be increased. The throttle valve 6 may not be electronically controlled. In that case, the power changing elements whose operations are controlled by the controller 10 are the injector 7 and the ignition unit 8, and the first suppressing control includes the fuel amount reduction control and the ignition timing retard control.

Although in the above-described embodiment, the wheelie condition and the slip condition are described as the power suppressing condition, the controller 10 may perform the determination based on only one of the wheelie condition and the slip condition as the power suppressing condition. In other words, the controller 10 may perform the determination based on conditions other than the wheelie condition and the slip condition.

As the power suppressing conditions other than the wheelie condition and the slip condition, there are a launch condition, a speed limit condition, and an engine speed limit condition. The launch condition is such that the rider wishes to start the vehicle at a top speed. In a case where the controller 10 determines that the launch condition is met, the controller 10 initiates the launch control for automatically adjusting the engine power (engine speed and engine torque) suitable for a good start, based on the state of a clutch and the vehicle speed, even when the rider opens an accelerator to a fully open position. In a case where the controller 10 determines that a speed limit condition is met (e.g., the vehicle speed reaches a predetermined limit speed such as 300 km/h), the controller 10 performs a speed limit control for automatically adjusting the engine power so that the vehicle speed does not exceed the predetermined limit speed. In a case where the controller 10 determines that the engine speed limit condition is met, for example, the engine speed reaches a predetermined limit engine speed (e.g., 14,000 rpm), the controller 10 initiates an over-rev limit control for automatically adjusting the engine power so that the engine speed does not exceed the predetermined limit engine speed even when the rider opens the accelerator to the fully open position.

The compensation performed based on the environment parameter is not limited to the compensation performed by the multiplication of the coefficient, and other calculation methods may be used. For example, the above-described formulas (1a), (1b), (2a), (2b), and (3) may be changed as follows:

$$S=B-(Y+K) \quad (1a')$$

$$S=B+Y+K \quad (1b')$$

$$S=B\times(Y+K) \quad (2a')$$

$$S=B\times(1-Y+K) \quad (2b')$$

$$S=Y+K \quad (3')$$

K is an environment compensation term decided based on the environment parameter.

The engine to be controlled by the engine power suppressing device may be a diesel engine. The engine power suppressing device according to the present invention can be suitably used in a high-power engine. The engine power suppressing device is suitably used in a vehicle (e.g., motorcycle) with a high power-to-weight ratio [W/g], and is applicable to vehicles other than the motorcycle.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An engine power suppressing device comprising:
   a controller which controls an operation of a power changing element which changes engine power for driving a vehicle; and
   an environment sensor which detects an environment parameter indicating an environment in which the vehicle is used,
   wherein the controller determines whether or not a power suppressing condition, in which a vehicle state of the vehicle is a state in which a driving power transmitted to a drive wheel is excessively large and the engine power is to be suppressed, is met,
   wherein in a case where the controller determines that the power suppressing condition is met,
   the controller sets a suppressing value for the power changing element to suppress the engine power, and compensates the suppressing value based on the environment parameter detected by the environment sensor.

2. The engine power suppressing device according to claim 1,
   wherein the environment parameter is an environment value which affects the engine power.

3. The engine power suppressing device according to claim 2,
   wherein the environment parameter is an atmospheric pressure, and the environment sensor is an atmospheric pressure sensor which detects the atmospheric pressure in a region surrounding the vehicle, and
   wherein the controller compensates the suppressing value so that the engine power is more suppressed as the atmospheric pressure detected by the atmospheric pressure sensor is higher.

4. The engine power suppressing device according to claim 1, comprising:
   a vehicle state sensor which detects the vehicle state,
   wherein in a case where the controller determines that the power suppressing condition is met,
   the controller sets the suppressing value based on the vehicle state detected by the vehicle state sensor, and compensates based on the environment parameter the suppressing value set based on the vehicle state.

5. The engine power suppressing device according to claim 1, comprising:
   a driving operation sensor which detects a driving operation,
   wherein in a case where the controller determines that at least the power suppressing condition is not met,
   the controller sets a base value for the power changing element according to a base rule based on the driving operation detected by the driving operation sensor, and compensates the base value based on the environment parameter detected by the environment sensor, and
   wherein in a case where the controller determines that the power suppressing condition is met, the controller sets the suppressing value according to a power suppressing rule different from the base rule, and compensates the suppressing value based on the environment parameter detected by the environment sensor.

6. The engine power suppressing device according to claim 5,
   wherein a degree of a sensitivity of the suppressing value with respect to a change in the driving operation which is defined by the power suppressing rule is less than the degree of the sensitivity of the base value with respect to the change in the driving operation which is defined by the base rule.

7. The engine power suppressing device according to claim 5,
   wherein in a case where the controller determines that the power suppressing condition is met,
   the controller sets the suppressing value based on the vehicle state according to the power suppressing rule, and compensates the suppressing value so that the engine power is more suppressed as a power excess degree based on the environment parameter is higher.

8. The engine power suppressing device according to claim 1,
   wherein in a case where the controller determines that the power suppressing condition is met,
   the controller suppresses the engine power in such a manner that the controller performs both of a first suppressing control for suppressing the engine power while performing combustion of an air-fuel mixture at a first rate, and a second suppressing control for suppressing the engine power while performing the combustion of the air-fuel mixture at a reduced rate.

9. The engine power suppressing device according to claim 1,
   wherein in each of a case where the power suppressing condition is met and a case where the power suppressing condition is not met, the controller compensates the engine power according to a rule based on the environment parameter, the rule being different between the case where the power suppressing condition is met and the case where the power suppressing condition is not met.

10. The engine power suppressing device according to claim 9, wherein in the case where the power suppressing condition is not met, the controller compensates a fuel amount based on the environment parameter, and wherein in the case where the power suppressing condition is met, the controller compensates a throttle valve opening degree based on the environment parameter.

11. The engine power suppressing device according to claim 9, wherein in the case where the power suppressing condition is not met, the controller compensates a fuel amount based on the environment parameter, and wherein in the case where the power suppressing condition is met, the controller compensates an ignition timing based on the environment parameter.

12. The engine power suppressing device according to claim 9, wherein in the case where the power suppressing condition is not met, the controller compensates a fuel amount based on the environment parameter, and wherein in the case where the power suppressing condition is met, the controller compensates a throttle valve opening degree and an ignition timing based on the environment parameter.

\* \* \* \* \*